US009806603B2

(12) United States Patent
Zeuch et al.

(10) Patent No.: US 9,806,603 B2
(45) Date of Patent: Oct. 31, 2017

(54) CIRCUIT WITH COMPARISON OF INPUT VOLTAGE TO UPPER AND LOWER THRESHOLDS

(71) Applicant: PHOENIX CONTACT GMBH & CO KG, Blomberg (DE)

(72) Inventors: Jochen Zeuch, Blomberg (DE); Hartmut Henkel, Blomberg (DE)

(73) Assignee: PHOENIX CONTACT GMBH & CO KG, Blomberg (DE)

( * ) Notice: Subject to any disclaimer, the term of this patent is extended or adjusted under 35 U.S.C. 154(b) by 75 days.

(21) Appl. No.: 14/787,626

(22) PCT Filed: Apr. 25, 2014

(86) PCT No.: PCT/EP2014/058443
§ 371 (c)(1),
(2) Date: Oct. 28, 2015

(87) PCT Pub. No.: WO2014/177463
PCT Pub. Date: Nov. 6, 2014

(65) Prior Publication Data
US 2016/0105099 A1    Apr. 14, 2016

(30) Foreign Application Priority Data

Apr. 30, 2013    (DE) .................. 10 2013 104 380

(51) Int. Cl.
*H02M 1/32*    (2007.01)
*H02M 3/04*    (2006.01)
*H02J 9/06*    (2006.01)

(52) U.S. Cl.
CPC .............. *H02M 3/04* (2013.01); *H02J 9/061* (2013.01); *H02M 1/32* (2013.01); *Y04S 20/18* (2013.01)

(58) Field of Classification Search
CPC . H02M 1/32; H02M 2001/0025; Y04S 20/18; Y04S 10/24; H02H 3/207;
(Continued)

(56) References Cited

U.S. PATENT DOCUMENTS 3,882,412 A    5/1975 Apple, Jr.
5,399,956 A    3/1995 DeLuca et al.
(Continued)

FOREIGN PATENT DOCUMENTS

DE         10018943 A1    10/2001
DE   10 2005 027 211 A1   12/2006
(Continued)

OTHER PUBLICATIONS

Office Action dated Jan. 16, 2014, by the German Patent Office in corresponding German Patent Application No. 10 2013 104 380.1. (10 pages).
(Continued)

*Primary Examiner* — Harry Behm
(74) *Attorney, Agent, or Firm* — Buchanan Ingersoll & Rooney PC

(57) ABSTRACT

The invention relates to a circuit arrangement, having: a comparator device for comparing a value of an electrical input voltage with an upper threshold value and/or with a lower threshold value; an increasing device for increasing an electrical output voltage if the comparison by the comparator device shows that the value of the input voltage is greater than the upper threshold value; and a reducing device for reducing the electrical output voltage if the comparison shows that the value of the input voltage is less than the lower threshold value.

18 Claims, 3 Drawing Sheets

Figure 1:
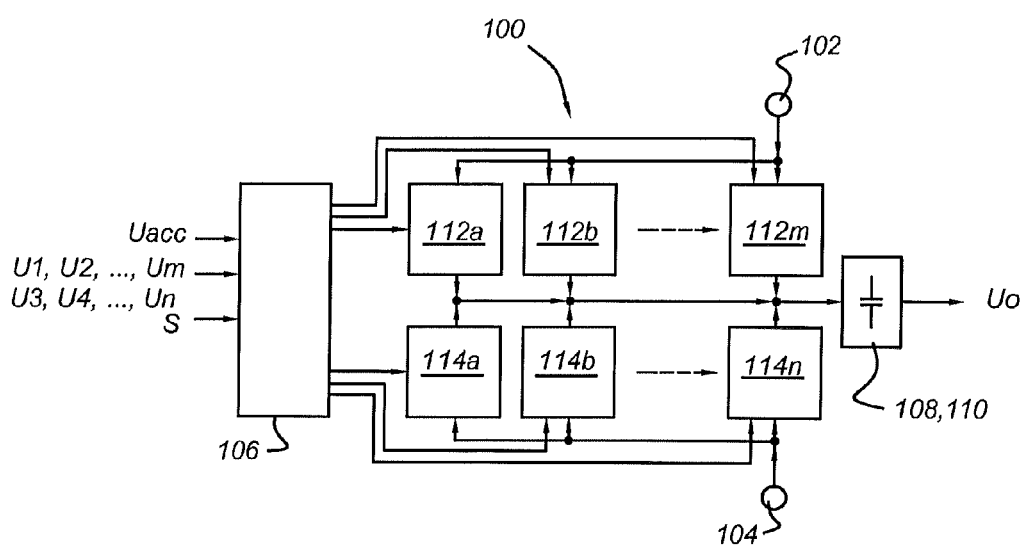

(58) Field of Classification Search
CPC .. H02H 3/202; G01R 19/165; G01R 19/1659; G01R 19/16595
See application file for complete search history.

(56) References Cited

U.S. PATENT DOCUMENTS

| | | | |
|---|---|---|---|
| 6,121,694 A | 9/2000 | Thereze | |
| 6,300,744 B1 | 10/2001 | Shum | |
| 6,781,502 B1* | 8/2004 | Robb | H02H 3/087 337/167 |
| 2002/0126836 A1 | 9/2002 | Harrow et al. | |
| 2003/0035308 A1 | 2/2003 | Lynch et al. | |
| 2004/0095784 A1* | 5/2004 | Zhou | H02M 5/458 363/37 |
| 2004/0145357 A1 | 7/2004 | Lynch et al. | |
| 2004/0164707 A1 | 8/2004 | Veselic et al. | |
| 2004/0174987 A1 | 9/2004 | Harrow et al. | |
| 2006/0261823 A1* | 11/2006 | Parker | G01R 19/16595 324/713 |
| 2008/0258688 A1 | 10/2008 | Hussain et al. | |
| 2010/0079114 A1 | 4/2010 | So et al. | |
| 2012/0049808 A1 | 3/2012 | Nakai | |
| 2013/0120887 A1* | 5/2013 | Chen | H02H 7/18 361/62 |

FOREIGN PATENT DOCUMENTS

| | | |
|---|---|---|
| EP | 0 847 124 A1 | 6/1998 |
| WO | WO 03/010877 A1 | 2/2003 |

OTHER PUBLICATIONS

International Search Report (PCT/ISA/210) dated Jul. 18, 2014, by the European Patent Office as the International Searching Authority for International Application No. PCT/EP2014/058443.

* cited by examiner

CIRCUIT WITH COMPARISON OF INPUT VOLTAGE TO UPPER AND LOWER THRESHOLDS

The invention relates to a circuit arrangement.

Circuit arrangements, e.g. current regulators, are used for example in electrical cabinets. In an electrical cabinet, industrial electrical devices are in many cases supplied with a direct current of low voltage. The direct voltage network is fed for example by one or more power supplies from the main power system. The supply energy is substantially less limited in a direct current supply network than in an alternating current system. Thus, in the case of e.g. modular equipment or simultaneous operation, overloading of the direct current voltage network can occur along with loss or faulty operation of the system or individual components.

One cause of overloading can be a limiting due to excessively high charging energy of an energy storage device.

In an energy storage module such as for example an uninterruptible power supply (UPS) or a capacitor module, electrical energy is needed to charge the energy storage module. This electrical energy is limited by an upstream component such as a voltage feed or a fuse. Other components can likewise require fluctuating additional amounts of electrical energy. The energy storage device can thereby be of dipole or quadripole design. It is charged as fast as possible in order to obtain greater electrical energy store availability. If too much electrical energy is required to charge the energy storage device, a limiting of the upstream energy source occurs, thus usually a voltage drop. To avoid overloading of the upstream energy source, the input voltage is monitored. When the input voltage falls below a certain value, the charging process is aborted.

A further cause of overload can be a limiting due to the connection of a capacitive load or a short circuiting of a direct current converter (DC/DC converter).

A direct current converter (DC/DC converter) applicably converts the electrical input energy for one or more electrical devices. When a load is connected to the output, a limiting of the direct current converter (DC/DC converter) can occur, particularly in the case of large capacitive load. To keep the voltage drop as slight as possible, the current limiting is for example delayed or the converter can temporarily deliver a clearly higher electrical output for up to a few seconds. The converter can consume a lot of energy due to brief peak current consumption or overload upon failure. This can cause an inadmissibly high voltage drop at the converter input. An upstream rectifier or power supply unit (AC/DC converter) or direct current converter (DC/DC converter) can be incorporated into the limiting and reduce the output voltage, whereby other parallel-connected electrical devices can malfunction.

The electrical devices connected to the main power network are switched off by e.g. converters via an input voltage monitoring system (VLO). Other electrical devices continue to malfunction and may output erroneous signals. Upon a restart, supported by a soft starter device as applicable, the electrical device is repeatedly connected.

A direct current power supply is known from DE 10 2005 027 211 A1. The direct current power supply comprises a controller with which the provided voltage can essentially be converted to the magnitude of the predefined compensating voltage. A battery charging circuit thereby charges the electrical device during normal operation. A control unit monitors the input voltage via a connection. Should it drop below a given threshold value, the control unit directs the controller such that the predefined compensating voltage output remains constant. Doing so uses energy from the energy storage device. However, low energy consumption phases will not be used to charge the energy storage device.

It is thus the task of the present invention to provide a circuit arrangement able to react more flexibly to fluctuating energy requirements.

This task is solved by the subject matter incorporating the features according to the independent claims. Advantageous embodiments form the subject matter of the dependent claims, the description and the drawings.

The present invention is based on the realization that operational reliability can be increased when the input voltage is compared to upper and lower threshold values and the output voltage is increased or reduced according to the comparison.

In accordance with a first aspect, the task is solved by a circuit arrangement comprising:
  a comparator device for comparing a value of an electrical input voltage to an upper threshold value and a lower threshold value,
  an increasing device for increasing an electrical output voltage when the comparison by the comparator device shows that the value of the input voltage is greater than the upper threshold value, and
  a reducing device for reducing the electrical output voltage when the comparison shows that the value of the input voltage is less than the lower threshold value.

This thereby achieves the technical advantage of determining, based on comparing the input voltage value to an upper threshold and a lower threshold, that the output voltage reaches a critical value, whereupon the output voltage is then increased or decreased. An energy storage device can thus be electrically charged upon the exceeding of an upper threshold value so that an electrically charged energy storage device is available when needed, thereby increasing the operational reliability.

In one advantageous embodiment, the circuit arrangement is configured to increase the output voltage when the comparator device determines that the value of the input voltage is greater than the upper threshold value. This thereby achieves the technical advantage of providing, when there is a particularly high input voltage, an increased output voltage with which for example an energy storage device can be charged.

In one advantageous embodiment, the circuit arrangement is configured to compare the electrical output voltage value to a maximum output voltage limit value and when the comparison shows that the electrical output voltage value is greater than the maximum output voltage limit value, set the output voltage value to the maximum output voltage limit value or switch off the circuit arrangement. This thereby achieves the technical advantage of the output voltage not being able to assume values higher than a maximum possible output voltage due to the upper threshold value being increased. This thereby increases the operational reliability.

In one advantageous embodiment, the circuit arrangement is configured to reduce the electrical output voltage when the comparator device determines that the input voltage value is less than the lower threshold value. This thereby achieves the technical advantage of reducing the output voltage upon a particularly low input voltage. An energy storage device can then for example be discharged.

In one advantageous embodiment, the circuit arrangement comprises a plurality of increasing devices, wherein each of the increasing devices is assigned a respective upper threshold value. This thereby achieves the technical advantage of staggering the actuating of the individual increasing devices, and hence increasing the output voltage, based on the magnitude of the input voltage. Thus, the output voltage can be modulated in particularly finely tuned manner.

In one advantageous embodiment, the circuit arrangement comprises a plurality of reducing devices, wherein each of the reducing devices is assigned a respective lower threshold value. This thereby achieves the technical advantage of staggering the actuating of the individual reducing devices, and hence reducing the output voltage, based on the magnitude of the input voltage. Thus, the output voltage can be modulated in particularly finely tuned manner.

In one advantageous embodiment, the circuit arrangement is configured to compare the value of the electrical output voltage to a minimum output voltage limit value and when the comparison shows that the electrical output voltage value is less than the minimum output voltage limit value, set the output voltage value to the minimum output voltage limit value or switch off the circuit arrangement. This thereby achieves the technical advantage of ensuring a minimum voltage for reliable operation or preventing malfunctions due to switching off upon the falling short of a minimum supply or output voltage.

In one advantageous embodiment, the circuit arrangement comprises a voltage divider for providing an upper threshold value and/or a lower threshold value. Doing so provides the technical advantage of the voltage divider being able to readily provide a plurality of upper or lower thresholds so as to be able to make finely tuned adjustments.

In a further advantageous embodiment, the comparator device comprises a comparator. This thereby achieves the technical advantage of being able to configure the circuit arrangement using reliable, readily available and at the same time inexpensive components.

In a further advantageous embodiment, the circuit arrangement is configured to modify a time constant value used to modify a target current regulating value. In the case of a large difference between the input voltage and an upper or lower threshold value, this thereby achieves the technical advantage of being able to quickly adjust a current limit value of a first, low time constant value whereas in the case of a slight difference between the input voltage and an upper or lower threshold, the current limit value of a second greater time constant value can be adjusted slowly. The time constant can be adjusted when the comparison by the comparator device shows that the input voltage value is greater than the upper threshold value or when the comparison shows that the input voltage value is less than the lower threshold value. Hence, the time constant value is variable or the time constant value can be selected from a first lesser value and a second greater value depending on whether there is a large or small difference. A large difference can for example occur when the differential value between the input voltage and an upper or lower threshold value exceeds a limit value. A small difference can for example occur when the differential value between the input voltage and an upper or lower threshold value falls short of a limit value.

In accordance with a second aspect, the task is solved by a current regulating method comprising:
  comparing a first electrical input voltage value to an upper threshold value,
  increasing a correction factor value for determining a target variable for regulating the current when the comparison shows that the input voltage value is greater than the upper threshold value,
  comparing the electrical input voltage value to a lower threshold value, and
  reducing the correction factor value when the comparison shows that the input voltage value is lower than the lower threshold value.

This thereby achieves the technical advantage of determining that the output voltage has reached a critical value on the basis of comparing the input voltage to an upper and a lower threshold value, whereupon the output voltage is then increased or reduced by increasing or reducing the correction factor. An energy storage device can thus be charged with electrical energy upon an upper threshold value being exceeded so that an electrically charged energy storage will be available when needed, thereby increasing operational reliability. Voltage reserves are hence used to charge an energy storage device when the input voltage exceeds the limit value, same being discharged when the input voltage is below the limit value.

In one advantageous embodiment, the correction factor value is increased by an upper correction value when the comparison shows that the input voltage value is higher than the upper threshold value. This thus achieves the technical advantage of increasing the correction factor, and thereby the electrical output voltage, and the method then proceeding with an increased correction factor. The first correction value can be a fixed, predefined correction value. A plurality of upper threshold values can furthermore be provided, whereby another correction value, e.g. fixed correction value, is assigned to each of the threshold values. This thus enables graduated correction factor increase, which allows a particularly finely tuned regulating of the current.

In a further advantageous embodiment, the input voltage and the upper threshold value are used to determine the upper correction value. This thereby achieves the technical advantage of being able to dynamically formulate the determination of the upper correction value, wherein the differential value between the input voltage and the upper threshold value for example gives rise to determining the upper correction value with a disproportionately high correction value being set upon a large difference between the input voltage and the upper threshold value and a disproportionately low correction value being established upon a lesser difference between the input voltage and the upper threshold value. Thus, a continuously variable modulation can be achieved. There can be a large difference for example when the differential value between the input voltage and the upper threshold is higher than a limit value. There can be a small difference for example when the differential value between the input voltage and the upper threshold is below a limit value.

In a further advantageous embodiment, the correction factor value is compared to an upper limit value and the correction factor is set to the value of the upper limit value when the correction factor value is greater than the upper limit value. This thereby achieves the technical advantage of the correction factor value not being able to assume inadmissibly high values. This thereby increases operational reliability.

In a further advantageous embodiment, the correction factor value is compared to an upper correction factor limit value and when the comparison shows that the correction factor value is greater than the upper correction factor limit value, the correction factor value is set to the value of the upper correction factor limit value. This thereby achieves the technical advantage of the correction factor value, and thereby the output voltage, not being able to assume values greater than a maximum possible output voltage due to increasing the upper threshold value. This thereby increases operational reliability.

In a further advantageous embodiment, the lower threshold value is decreased by a lower correction value when the comparison shows that the voltage value is less than the lower threshold value. This thereby achieves the technical advantage of reducing the correction factor, and thereby the electrical output voltage, and the method then proceeding with a reduced correction factor. The lower correction value can be a fixed, predefined correction value. A plurality of lower threshold values can furthermore be provided, whereby another correction value, e.g. a fixed correction value, is assigned to each of the threshold values. This thus enables a graduated correction factor increase, which allows a particularly finely tuned regulating of the current.

In a further advantageous embodiment, the input voltage and the lower threshold value are used to determine the lower correction value. This thereby achieves the technical advantage of being able to dynamically formulate the determination of the lower correction value, wherein the differential value between the input voltage and the lower threshold value for example gives rise to determining the lower correction value with a disproportionately high correction value being set upon a large difference between the input voltage and the lower threshold value and a disproportionately low correction value being established upon a lesser difference between the input voltage and the lower threshold value. Thus, continuously variable modulation can be achieved. There can be a large difference for example when the differential value between the input voltage and the lower threshold is higher than a limit value. There can be a small difference for example when the differential value between the input voltage and the lower threshold is below a limit value.

In a further advantageous embodiment, the correction factor value is compared to a lower limit value and the correction factor is set to the value of the lower limit value when the correction factor value is less than the lower limit value. This thereby achieves the technical advantage of the correction factor value not being able to assume inadmissibly low values, thereby increasing operational reliability.

In a further advantageous embodiment, the correction factor value is compared to a lower correction factor limit value and when the comparison shows that the correction factor value is less than the lower correction factor limit value, the correction factor value is set to the value of the lower correction factor limit value. This thereby achieves the technical advantage of the correction factor value, and thereby the output voltage, not being able to assume values below a minimum output voltage guaranteeing reliable operation due to decreasing the lower threshold value. This thereby increases operational reliability.

In a further advantageous embodiment, the correction factor value is compared to a cutoff limit value and a cutoff process initiated when the comparison shows that the correction factor value is less than the cutoff limit value. This thereby achieves the technical advantage of preventing malfunctions due to switching off upon the falling short of a minimum supply or output voltage. Initiating the cutoff process can incorporate the generating and sending of a switch-off signal able to effect switching off a current regulator or a circuit arrangement.

In accordance with a third aspect, the task is solved by a computer program having a program code for executing such a method when the program code runs on a computer.

Figure 2:
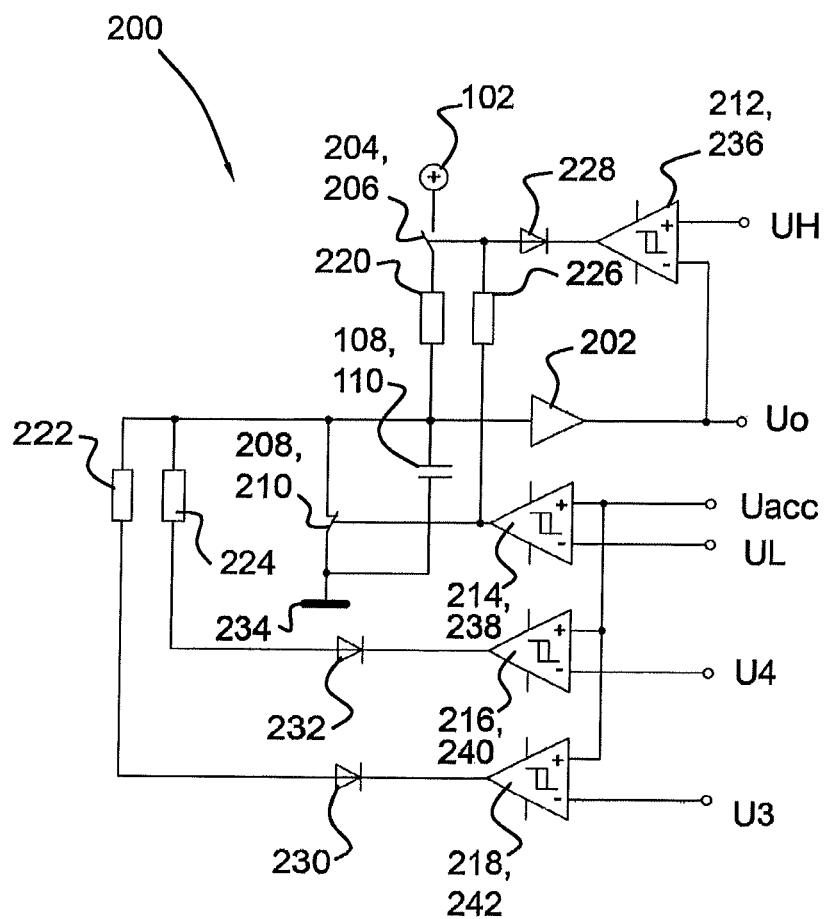
Figure 3:
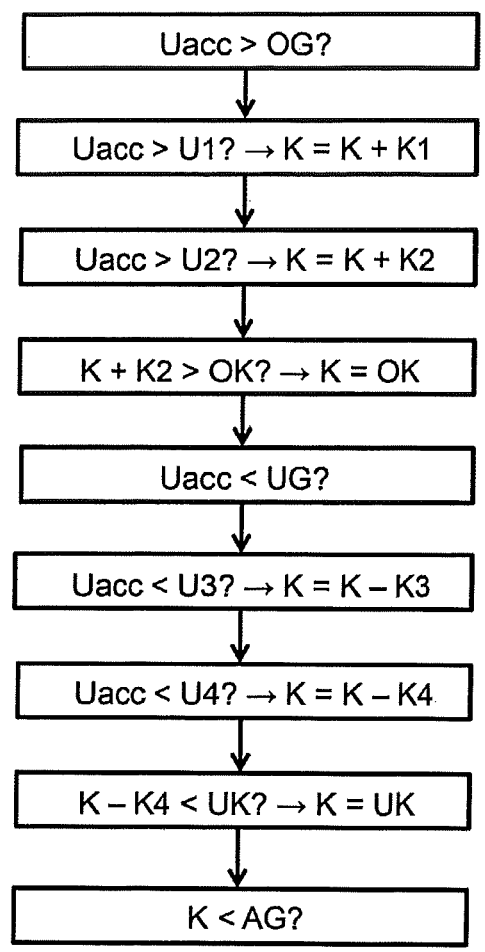

Reference will be made to the accompanying drawings in defining further embodiments. Shown are:

FIG. 1 a schematic representation of a circuit arrangement,

FIG. 2 a partial circuit arrangement of the circuit arrangement shown in FIG. 1, and FIG. 3 a flowchart for a method.

FIG. 1 shows a circuit arrangement 100.

The circuit arrangement 100 according to one embodiment comprises a first connection 102 for connecting a positive electrical supply voltage and a second connection 104 for connecting a negative electrical supply voltage. According to one embodiment, the circuit arrangement 100 further comprises an energy storage device 108 which, according to one embodiment, comprises a capacitor 110. According to one embodiment, the circuit arrangement 100 moreover comprises a comparator device 106, a plurality of increasing devices 112a, 112b, . . . 112m and a plurality of reducing devices 114a, 114b, . . . 114n.

The increasing devices 112a, 112b, . . . 112n and the reducing devices 114a, 114b, 114m are electroconductively connected to the comparator device 106 by means of electrical lines.

Electrical lines further electroconductively connect the increasing devices 112a, 112b, 112n to the first connection 102 while electrical lines electroconductively connect the reducing devices 114a, 114b, . . . 114m to the second connection 104. Electrical lines moreover electroconductively connect the increasing devices 112a, 112b, . . . 112n and the reducing devices 114a, 114b, . . . 114m to the energy storage device 108 which outputs the output voltage Uo.

The comparator device 106 is fed an input voltage Uacc. According to one embodiment, the comparator device 106 is further furnished a first upper threshold value U1, a second upper threshold value U2, as well as m further upper threshold values Um. The comparator device 106 is moreover furnished, according to one embodiment, a first lower threshold value U3, a second lower threshold value U4 as well as n further lower threshold values Un. The number of upper threshold values thus corresponds to the number of increasing devices 112a, 112b, . . . 112n and the number of lower threshold values corresponds to the number of reducing devices 114a, 114b, . . . 114m.

The circuit arrangement 100 activates upon receiving a start signal S. In operation, the input voltage Uacc is compared to the first upper threshold value U1, the second upper threshold value U2, the first lower threshold value U3 and the second lower threshold value U4. If the comparison performed by the comparator device 106 shows that the input voltage Uacc is higher than the first upper threshold value U1, increasing device 112a is actuated and the electrical voltage at the energy storage device 108 is thereby increased by a first value.

If the comparison performed by the comparator device 106 shows that the input voltage Uacc is higher than the second upper threshold value U2, increasing device 112b is actuated and the electrical voltage at the energy storage device 108 is thereby increased by a second value. In accordance with one embodiment, a current limiting target value of a current regulator is furthermore increased. This process continues according to one embodiment until the respective m-th upper threshold value Um is exceeded, whereupon the respective m-th increasing device 112m is then actuated and the voltage at the energy storage device 108 thereby increased.

If, conversely, the comparison performed by the comparator device 106 shows that the input voltage Uacc falls short of the first lower threshold value U3, the reducing device 104a is actuated and the electrical voltage at the energy storage device 108 thereby reduced by a third value so that the energy storage device 108 will again discharge. In accordance with one embodiment, a current limiting target value of a current regulator is furthermore reduced.

If the comparison performed by the comparator device 106 shows that the input voltage Uacc falls short of the second lower threshold value U4, reducing device 114b is actuated, thereby reducing the electrical voltage at the energy storage device 108 by a fourth value so that the energy storage device 108 will again discharge. In accordance with one embodiment, a current limiting target value of a current regulator is furthermore decreased. This process continues according to one embodiment until the respective n-th lower threshold value Un is undercut, whereupon the respective n-th reducing device 114m is then actuated and the voltage at the energy storage device 108 thereby reduced.

If the input voltage Uacc then rises again above the second lower threshold value U4 and the first lower threshold value U3, reducing devices 114a and 114b are reactivated. If the input voltage Uacc continues to rise, and in fact higher than the second upper threshold value U2 and higher than the first upper threshold value U1, increasing devices 112a, 112b are reactivated. In accordance with one embodiment, the current limiting target value of a current regulator is furthermore increased. The current limit value is thus continuously regulated to a maximum value during operation. Hence, according to one embodiment, the input voltage Uacc value is thus guaranteed to remain within a predefined range of values, which ensures reliable operation.

During operation, the current limiting continuously adapts dynamically to the respective load conditions. At high loads with low reserve, the load is for example reduced by lowering the electrical energy to charge the energy storage device 108; at lower load, the electrical energy is increased again. Upon a brief peak current consumption, the current limit value is lowered with decreasing input voltage Uacc, with the current limit value being increased again upon the input voltage Uacc rising.

The first upper threshold value U1 can be assigned a first time constant in accordance with one embodiment and the second upper threshold value U2 can be assigned a second time constant in accordance with one embodiment. In accordance with one embodiment, the first time constant is greater than the second time constant so that upon the exceeding of the second upper threshold value U2, the current limiting target value changes more quickly than when the first lower threshold value U1 is exceeded.

In accordance with one embodiment, the first lower threshold value U3 can further be assigned a third time constant and, in accordance with one embodiment, the second lower threshold value U4 can be assigned a fourth time constant. According to one embodiment, the third time constant is greater than the fourth time constant so that upon the exceeding of the second lower threshold value U4, the current limiting target value changes more quickly than when the first lower threshold value U3 is exceeded.

In accordance with one embodiment, a difference is established between the values of the input voltage Uacc and for example the first upper threshold value U1 or the first lower threshold value U3. Based on the difference, a value is then determined for a time constant at which the energy storage device 108 is charged or discharged. According to one embodiment, at a large difference, a high value, e.g. a disproportionately high value, is determined for the time constant whereas at a small difference, a small value, e.g. a disproportionately low value, is determined for the time constant. Thus, in the case of a large difference, the energy storage device 108 is charged or discharged quickly while at a small difference, the energy storage device 108 is charged or discharged slowly.

FIG. 2 shows a partial circuit arrangement 200 of the circuit arrangement 100.

The partial circuit arrangement 200 comprises a first connection 102 for a supply voltage. According to one embodiment, the partial circuit arrangement 200 further comprises the energy storage device 108 which, in accordance with one embodiment, comprises the capacitor 110.

Moreover, in accordance with one embodiment, the partial circuit arrangement 200 comprises an amplifier 202 for amplifying the electrical voltage of the capacitor 110 providing the output voltage Uo. Further components of the circuit arrangement are a first switch 204, formed as N/O contact 206 in accordance with one embodiment, and a second switch 208, formed as N/C contact 210 in accordance with one embodiment. The partial circuit arrangement 200 further comprises four comparator devices 212-218 in accordance with one embodiment, each comprising in accordance with one embodiment a comparator 236-242. Alternatively, the comparator devices 212-218 can comprise Schmitt triggers. The partial circuit arrangement 200 according to one embodiment additionally comprises three diodes 228-232, a ground connection 234 as well as four ohmic resistors 220-226.

The comparator device 212 is supplied with output voltage Uo and a maximum output voltage limit value UH, whereby the maximum output voltage limit value UH represents a maximum electrical output current. On the output side, the diode 228 electroconductively connects the comparator device 212 to the first switch 204 configured in accordance with one embodiment as N/O contact 206 so that upon an exceeding of threshold value UH, the circuit arrangement 100 can be switched off by the opening of the first switch 204.

The comparator device 214 is supplied the input voltage Uacc and a minimum output voltage limit value UL for switching off, for example upon an input voltage Uacc which is too low, or for an input voltage Uacc of 0 volts. On the output side, the comparator device 214 is electroconductively connected to the second switch 208 configured in accordance with one embodiment as N/C contact 210 and thus effects the opening of N/C contact 210, and thereby the switching off of circuit arrangement 100, when the input voltage Uacc falls below the minimum output voltage limit value UL.

The first lower threshold value U3 is supplied to the comparator device 218, whereby the comparator 218 is likewise supplied with input voltage Uacc. On the output side, the comparator device 216 is connected to the amplifier 202 and the capacitor 110, which is in turn connected to a ground connection 234, via diode 230 and ohmic resistor 222.

The second lower threshold value U4 is supplied to the comparator device 216, which is likewise fed input voltage Uacc. On the output side, the comparator device 216 is electroconductively connected to the amplifier 202 and the capacitor 110 via the diode 232 and the ohmic resistor 224.

In accordance with one embodiment, the ohmic resistor 220 is arranged between the capacitor 110 and the first switch 204, and ohmic resistor 226 and diode 228 are arranged in a row between the output of comparator device 214 and the output of comparator device 212.

After being switched on, the capacitor 110 is discharged and generates an output voltage Uo of 0 volts via amplifier 202. The input voltage Uacc has a higher value than the first lower threshold value U3, the second lower threshold value U4 and the minimum output voltage limit value UL. The maximum output voltage limit value UH is furthermore greater than the input voltage Uacc.

The first switch 204 is closed and the second switch 208 opened upon a start signal S. The capacitor 110 is then charged with electrical energy via the resistor 220.

When the output voltage Uo reaches threshold UH, the electrical voltage is maintained at the capacitor 110.

If, however, the input voltage Uacc drops below the first lower threshold value U3, the electrical voltage at the capacitor 110 is reduced via ohmic resistor 222 until the input voltage Uacc again exceeds the first lower threshold value U3 and the capacitor 110 is again charged via the ohmic resistor 220. The ohmic resistor 222 and the capacitor 110 thereby form in accordance with one embodiment e.g. the third time constant, with which the current limiting target value is modified.

If, on the other hand, the input voltage Uacc falls below the second lower threshold value U4, the electrical voltage at the capacitor 110 is reduced via ohmic resistor 224 until the active input voltage Uacc again exceeds the second lower threshold value U4. The ohmic resistor 224 and the capacitor 110 thereby form in accordance with one embodiment e.g. the fourth time constant, with which the current limiting target value is modified.

However, if the input voltage Uacc falls short of the minimum output voltage limit value UL, the capacitor 110 is completely discharged.

The partial circuit arrangement 200 shown in FIG. 2 can be expanded by further inputs for a first upper limit value U1 and a second upper limit value U2 connected to further comparator devices, wherein upon the exceeding of the first upper threshold value U1, the output voltage Uo is increased by charging the capacitor 110. When the input voltage Uacc exceeds the second upper threshold value U2, the capacitor 110 is likewise charged and the output voltage Uo thereby increased.

In place of the circuit arrangement 100 shown in FIG. 1, the function of the circuit arrangement 100 can be realized according to one embodiment by a computer program which, in accordance with one embodiment, is composed only of software components or, in accordance with another embodiment, is composed of a combination of software and hardware components.

FIG. 3 shows a flowchart for a method. In the method, in accordance with one embodiment, a correction factor K for calculating the current limit value is determined and continuously updated. In accordance with one embodiment, the computer program is executed with a program code in order to implement the method.

It is assessed in a first step whether the value of the correction factor K lies above a predefined upper limit value OG. When the value of the correction factor K is higher than the upper limit value OG, the correction factor K cannot be increased any further due to physical limitations such as, for example, a maximum supply voltage. In this case, the value for the correction factor K is set to the value of the upper limit value OG.

If, however, the value of the correction factor K lies below the upper limit value OG, it is assessed in a next step whether the electrical input voltage Uacc is higher than the first upper threshold value U1. If the value of the input voltage Uacc is higher than the first upper threshold value U1, the value for the correction factor K is increased by a first upper correction value K1.

The first upper correction value K1 can be a fixed, predefined value or the first upper correction value K1 can be determined from the value of the input voltage Uacc and the value of the upper threshold value U1. For example, the difference between the input voltage Uacc and the first upper threshold value U1 can hereby give rise to the forming of a disproportionately high correction value K in the case of a large difference and a disproportionately low correction value K in the case of a slight difference. In accordance with one embodiment, there can be a large difference when the differential value between the input voltage Uacc and the first upper threshold value U1 is higher than a limit value. There can be a small difference in accordance with one embodiment when the differential value between the input voltage Uacc and the first upper threshold value U1 is below the limit value.

Whether the input voltage Uacc exceeds the second upper threshold value U2 is assessed in a further step. If the value of the input voltage Uacc exceeds the second upper threshold value U2, the correction factor K is increased by a second upper correction value K2.

The second upper correction value K2 can be a fixed, predefined value or the second upper correction value K2 can be determined in a similar way as the first correction value K1. For example, the difference between the input voltage Uacc and the value of the second upper threshold value U2 can hereby give rise to the forming of a disproportionately high correction value K in the case of a large difference and a disproportionately low correction value K in the case of a slight difference. In accordance with one embodiment, there can be a large difference when the differential value between the input voltage Uacc and the second upper threshold value U2 is higher than a limit value. There can be a small difference in accordance with one embodiment when the differential value between the input voltage Uacc and the second upper threshold value U2 is below the limit value.

A further step then assesses whether the correction factor K obtained from the increase by the first upper correction value K1 and/or second upper correction value K2 is a value greater than an upper correction factor limit value OG. If this is the case, the value of the active correction factor K is set to the value of the upper correction factor limit value OG. This thereby prevents the correction factor K from assuming inadmissibly high values.

It is then assessed in a further step whether the value of the correction factor K is less than a lower limit value UG.

If the value of the correction factor K is below the lower limit value UG, the correction factor K cannot be reduced any lower. The lower limit value UG defines in accordance with one embodiment a minimum electrical output voltage with which reliable operation is possible. In this case; i.e. when the value of the correction factor K is below the first lower limit value UG, the value for the correction factor K is set to the lower limit value UG.

In a further step, the value of the correction factor K is compared to the first lower threshold value U3. When the value of the input voltage Uacc is less than the third lower threshold value U3, the value of the correction factor K is decreased by a first lower correction value K3.

The first lower correction value K3 can be a fixed, predefined value or the first lower correction value K3 can be determined in a similar way as the first upper correction value K1. For example, the difference between the input voltage Uacc and the first lower threshold value U3 can hereby give rise to the forming of a disproportionately high correction value K in the case of a large difference and a disproportionately low correction value K in the case of a slight difference. In accordance with one embodiment, there can be a large difference when the differential value between the input voltage Uacc and the first lower threshold value U3 is higher than a limit value. There can be a small difference in accordance with one embodiment when the differential value between the input voltage Uacc and the first lower threshold value U3 is below the limit value.

In a further step, the value of the correction factor K is compared to the second lower threshold value U4. When the value of the correction factor K is less than the second lower threshold value U4, the value of the correction factor K is decreased by a second lower correction value K4.

The second lower correction value K4 can be a fixed, predefined value or the second lower correction value K4 can be determined in a similar way as the first correction value K1. For example, the difference between the input voltage Uacc and the second lower threshold value U4 can hereby give rise to the forming of a disproportionately high correction value K in the case of a large difference and a disproportionately low correction value K in the case of a slight difference. In accordance with one embodiment, there can be a large difference when the differential value between the input voltage Uacc and the second lower threshold value U4 is higher than a limit value. There can be a small difference in accordance with one embodiment when the differential value between the input voltage Uacc and the second lower threshold value U4 is below the limit value.

A further step then assesses whether the correction factor K obtained from the reduction by the first lower correction value K3 and/or second lower correction value K4 is a value which is less than a lower correction factor limit value UK. If this is the case, the value of the active correction factor K is set to the value of the lower correction factor limit value UK. This thereby prevents the correction factor K from assuming inadmissibly low values.

It is provided in a further step for the correction factor to be compared to a cutoff limit value AG and a cutoff process initiated when the comparison shows that the value of the correction factor K is less than the cutoff limit value AG. The initiating can incorporate the generating and sending of a switch-off signal able to effect the switching off, entirely or in part, of a current regulator or a circuit arrangement 100.

LIST OF REFERENCE NUMERALS 100 circuit arrangement
102 first connection
104 second connection
106 comparator device
108 energy storage device
110 capacitor
112a increasing device
112b increasing device
112c increasing device
114a reducing device
114b reducing device
114c reducing device
200 partial circuit arrangement
202 amplifier
204 first switch
206 N/O contact
208 second switch
210 N/C contact
212 comparator device
214 comparator device
216 comparator device
218 comparator device
220 ohmic resistor
222 ohmic resistor
224 ohmic resistor
226 ohmic resistor
228 diode
230 diode
232 diode
234 ground
236 comparator
238 comparator
240 comparator
242 comparator
AG cutoff limit value
K correction factor
K1 first upper correction value
K2 second upper correction value
K3 first lower correction value
K4 second lower correction value
OG upper limit value
OK upper correction factor limit value
S start signal
U1 first upper threshold value
U2 second upper threshold value
U3 first lower threshold value
U4 second lower threshold value
Uacc input voltage
UG lower limit value
UH maximum output voltage limit value
UK lower correction factor limit value
UL minimum output voltage limit value
Um m-th upper threshold value
Un n-th lower threshold value
Uo output voltage

The invention claimed is:

1. A circuit arrangement, comprising:
a comparator device for comparing a value of an electrical input voltage to an upper threshold value and to a lower threshold value;
an increasing device for increasing an electrical output voltage when a comparison by the comparator device shows that the value of the input voltage is greater than the upper threshold value; and
a reducing device for reducing the electrical output voltage when the comparison shows that the value of the input voltage is less than the lower threshold value.

2. The circuit arrangement according to claim 1, wherein the circuit arrangement is configured to compare the value of the electrical output voltage to a maximum output voltage limit value and set the value of the electrical output voltage to the value of the maximum output voltage limit value or switch off the circuit arrangement when the comparison shows that the value of the electrical output voltage is greater than the maximum output voltage limit value.

3. The circuit arrangement according to claim 1, wherein the circuit arrangement comprises:
a plurality of increasing devices, wherein each of the increasing devices is assigned a respective upper threshold value.

4. The circuit arrangement according to claim 1, wherein the circuit arrangement comprises:
a plurality of reducing is assigned a respective lower threshold value.

5. The circuit arrangement according to claim 1, wherein the circuit arrangement is configured to compare the value of the electrical output voltage to a minimum output voltage limit value and set the value of the output voltage to the minimum output voltage limit value or switch off the circuit arrangement when the comparison shows that the value of the electrical output voltage is less than the minimum output voltage limit value.

6. The circuit arrangement according to claim 1, wherein the circuit arrangement comprises:
a voltage divider for providing an upper threshold value and/or a lower threshold value.

7. The circuit arrangement according to claim 1, wherein the comparator device comprises:
a comparator.

8. The circuit arrangement according to claim 1, wherein the circuit arrangement is configured to modify a time constant value used to modify a target current regulating value.

9. A method for regulating current, comprising:
comparing a value of an electrical input voltage to an upper threshold value;
increasing a value of a correction factor for determining a target variable for the current regulation when a comparison shows that the value of the input voltage is greater than the upper threshold value;
comparing the value of the electrical input voltage to a lower threshold value; and
reducing the value of the correction factor when the comparison shows that the value of the electrical input voltage is lower than the lower threshold value.

10. The method according to claim 9, wherein the value of the correction factor is increased by an upper correction value when the comparison shows that the value of the electrical input voltage is greater than the upper threshold value.

11. The method according to claim 10, wherein the input voltage and the upper threshold value are used to determine the upper correction value.

12. The method according to claim 9, wherein the value of the correction factor is compared to an upper limit value and the value of the correction factor is set to the value of the upper limit value when the value of the correction factor is greater than the upper limit value.

13. The method according to claim 9, wherein the value of the correction factor is compared to an upper correction factor limit value and the value of the correction factor is set to the upper correction factor limit value when a comparison shows that the value of the correction factor is greater than the upper correction factor limit value.

14. The method according to claim 9, wherein the value of the correction factor is reduced by a lower correction value when the comparison shows that the value of the input voltage is less than the lower threshold value.

15. The method according to claim 14, wherein the input voltage and the lower threshold value are used to determine the lower correction value.

16. The method according to claim 9, wherein the value of the correction factor is compared to a lower limit value and the value of the correction factor is set to the lower limit value when the value of the correction factor is less than the lower limit value.

17. The method according to claim 9, wherein the value of the correction factor is compared to a lower correction factor limit value and the value of the correction factor is set to the lower correction factor limit value when the comparison shows that the value of the correction factor is less than the lower correction factor limit value.

18. The method according to claim 9, wherein the value of the correction factor is compared to a cutoff limit value and a cutoff process is initiated when a comparison shows that the value of the correction factor is less than the cutoff limit value.

* * * * *